(12) United States Patent
Joung et al.

(10) Patent No.: US 9,071,884 B2
(45) Date of Patent: Jun. 30, 2015

(54) STORAGE FILE FORMAT FOR MULTIMEDIA STREAMING FILE, AND STORAGE METHOD AND CLIENT APPARATUS USING THE SAME

(75) Inventors: Do-young Joung, Seoul (KR); Gil-yoon Kim, Suwon-si (KR); Yong-gyoo Kim, Seoul (KR); Soon-yong Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 60 days.

(21) Appl. No.: 13/164,199

(22) Filed: Jun. 20, 2011

(65) Prior Publication Data

US 2011/0314174 A1  Dec. 22, 2011

Related U.S. Application Data

(60) Provisional application No. 61/356,107, filed on Jun. 18, 2010.

(30) Foreign Application Priority Data

Sep. 20, 2010  (KR) .......................... 10-2010-0092508

(51) Int. Cl.
*G06F 15/16* (2006.01)
*H04N 21/6587* (2011.01)
(Continued)

(52) U.S. Cl.
CPC ..... *H04N 21/6587* (2013.01); *H04N 21/23439* (2013.01); *H04N 21/2402* (2013.01); *H04N 21/4334* (2013.01); *H04N 21/84* (2013.01); *H04N 21/8455* (2013.01); *H04N 21/8456* (2013.01); *H04N 21/85406* (2013.01); *H04L 65/4084* (2013.01); *H04L 65/607* (2013.01); *G11B 27/105* (2013.01); *G11B 27/322* (2013.01); *G11B 27/329* (2013.01)

(58) Field of Classification Search
USPC .................................................. 709/231, 237
See application file for complete search history.

(56) References Cited

U.S. PATENT DOCUMENTS 7,499,446 B1  3/2009  Gou et al.
8,286,213 B2  10/2012  Seo
(Continued)

FOREIGN PATENT DOCUMENTS

CN     1551643 A    12/2004
JP  2008-504750 A    2/2008
(Continued)

OTHER PUBLICATIONS

International Search Report (PCT/ISA/210) and Written Opinion (PCT/ISA/237), dated Dec. 22, 2011, issued by the International Searching Authority in corresponding International Application No. PCT/KR2011/004489.
(Continued)

*Primary Examiner* — Philip Chea
*Assistant Examiner* — Van Kim T Nguyen
(74) *Attorney, Agent, or Firm* — Sughrue Mion, PLLC

(57) ABSTRACT

A storage file format for replaying an adaptively streamed multimedia stream, a client apparatus using the storage file format, and a method of storing a multimedia stream in the client apparatus are provided. According to the storage file format, meta-information for playing fragments and fragment access meta-information for replaying fragments are added to fragments.

17 Claims, 6 Drawing Sheets

(51) Int. Cl.
*H04N 21/2343* (2011.01)
*H04N 21/24* (2011.01)
*H04N 21/433* (2011.01)
*H04N 21/84* (2011.01)
*H04N 21/845* (2011.01)
*H04N 21/854* (2011.01)
*H04L 29/06* (2006.01)
*G11B 27/10* (2006.01)
*G11B 27/32* (2006.01)

(56) References Cited

U.S. PATENT DOCUMENTS

| | | | |
|---|---|---|---|
| 8,811,475 | B2 | 8/2014 | Tong et al. |
| 2004/0086051 | A1 | 5/2004 | Mizoguchi |
| 2005/0281287 | A1* | 12/2005 | Niinomi et al. ............... 370/474 |
| 2006/0088094 | A1 | 4/2006 | Cieplinski et al. |
| 2006/0251167 | A1 | 11/2006 | Van Der Schaar et al. |
| 2008/0005273 | A1* | 1/2008 | Agarwalla et al. ............ 709/217 |
| 2008/0095189 | A1* | 4/2008 | Frazier et al. ................. 370/469 |
| 2009/0297123 | A1* | 12/2009 | Virdi et al. ...................... 386/69 |
| 2010/0142556 | A1* | 6/2010 | Wang et al. ................... 370/474 |
| 2011/0080940 | A1* | 4/2011 | Bocharov et al. ........ 375/240.01 |
| 2011/0126248 | A1* | 5/2011 | Fisher et al. ..................... 725/95 |
| 2011/0307545 | A1* | 12/2011 | Bouazizi ........................ 709/203 |
| 2012/0221741 | A1* | 8/2012 | Frojdh et al. .................. 709/231 |

FOREIGN PATENT DOCUMENTS

| | | | |
|---|---|---|---|
| KR | 10-2003-0014404 | A | 2/2003 |
| KR | 10-2008-0027043 | A | 3/2008 |
| KR | 10-2009-0024170 | A | 3/2009 |
| WO | 2011038013 | A2 | 3/2011 |
| WO | 2012021543 | A1 | 2/2012 |
| WO | 2010/117316 | A1 | 12/2014 |

OTHER PUBLICATIONS

Singer, "Editors draft of the Part 12 file format amendment", 86 MPEG Meeting, Oct. 20, 2008, No. M15812, Busan, XP 030044409; 150 pages total.

Rhyu et al., "Response to Call for Proposals on HTTP Streaming of MPEG Media", 93 MPEG Meeting, Jul. 26, 2010, 60 pages total, Geneva, XP 030046369.

Zambelli et al., " IIS Smooth Streaming Technical Overview", Internet Citation, Mar. 23, 2009, 17 pages total, XP002617719.

Communication dated Jul. 7, 2014 issued by European Patent Office in counterpart European application No. 11796006.2.

Communication dated Dec. 24, 2014 issued by the Japanese Patent Office in counterpart Japanese Patent Application No. 2013-515275.

Communication dated Feb. 2, 2015 issued by the State Intellectual Property Office of the People's Republic of China in counterpart Chinese Patent Application No. 201180039860.0.

* cited by examiner

STORAGE FILE FORMAT FOR MULTIMEDIA STREAMING FILE, AND STORAGE METHOD AND CLIENT APPARATUS USING THE SAME

CROSS-REFERENCE TO RELATED PATENT APPLICATION

This application claims the benefit of U.S. Provisional Application No. 61/356,107, filed on Jun. 18, 2010, in the USPTO and claims priority from Korean Patent Application No. 10-2010-0092508, filed on Sep. 20, 2010, in the Korean Intellectual Property Office, the disclosures of which are incorporated herein in their entirety by reference.

BACKGROUND

1. Field

Apparatuses and methods consistent with exemplary embodiments relate to a storage file format on a client side for supporting storage and replay of an adaptive multimedia stream provided from a server, a client apparatus using the storage file format, and a method of storing a multimedia stream in the client apparatus.

2. Description of the Related Art

Recently, a streaming service of transmitting multimedia data via the Internet or a mobile communication network has been widely used.

A streaming service is a multimedia service enabling the playing of multimedia data without storing it in a terminal of a user. While streaming services which provide data at a fixed bit rate have been used, an adaptive streaming service with a variable bit rate depending on a network environment has been used recently. For adaptive streaming, a server side prepares media streaming data of various bit rates in advance and transmits data by changing a bit rate according to a network environment or a client's request.

The adaptive streaming service is performed by transmitting and receiving data in units of fragments called chunks between a server and a client. That is, the server divides the whole multimedia data into fragments, each in units of seconds, and transmits the fragments, and the client receives and reproduces the multimedia data in units of fragments.

The adaptive streaming service premises that a client side reproduces multimedia data provided from a service side in almost real-time excluding a time difference, such as a latency according to data communication and a buffering time of the client side for jitter compensation and multimedia data synchronization. Thus, it is difficult for the client side to store and replay multimedia data in the adaptive streaming service.

SUMMARY

Exemplary embodiments provide a storage file format for replaying an adaptive multimedia stream, a client apparatus using the storage file format, and a method of storing a multimedia stream in the client apparatus.

Exemplary embodiments may also provide a client apparatus capable of performing a high quality data reproduction when storing and replaying multimedia streaming data and a method of storing a multimedia stream in the client apparatus.

According to an aspect of an exemplary embodiment, there is provided a method of storing a multimedia streaming file, the method including: receiving and storing meta-information for playing a multimedia streaming file from a server, the multimedia streaming file comprising a plurality of levels of tracks, wherein, in each of the plurality of levels of tracks, multimedia data is encoded at a different bit rate; receiving and storing fragments comprising the multimedia streaming file; acquiring random access information for randomly accessing the stored fragments; and generating and storing fragment access meta-information for replaying the stored fragments based on the acquired random access information.

According to an aspect of another exemplary embodiment, there is provided a client apparatus for receiving a multimedia streaming file, the client apparatus including: a communication unit which transmits a request for a multimedia streaming file and receives the multimedia streaming file from a server, wherein the multimedia streaming file comprises a plurality of levels of tracks, wherein, in each of the plurality of levels of tracks, multimedia data is encoded at a different bit rate; a storage unit which stores fragments forming the multimedia streaming file received by the communication unit; a reproduction unit which plays the multimedia streaming file; a fragment access database which stores random access information for randomly accessing fragments stored in the storage unit; a fragment access management unit which determines, based on the random access information stored in the fragment access database whether the fragments forming the multimedia streaming file are stored and controlling the communication unit to receive fragments that are not stored; and a metadata input and output unit which generates meta-information for playing the multimedia streaming file and fragment access meta-information for replaying the stored fragments, stores the meta-information and the fragment access meta-information in the storage unit, and reads the meta-information and the fragment access meta-information stored in the storage unit.

According to an aspect of another exemplary embodiment, there is provided a storage file format for storing a multimedia streaming file, the storage file format including: a file type (ftyp) box for storing a file type; a movie metadata (moov) box for storing meta-information for playing the multimedia streaming file to be stored; a fragment having a fragment header information (moof: movie fragment metadata) box for storing meta-information of received fragments and a media data (mdat) box for storing media data of the received fragments; and an movie fragment random access (mfra) box, which is fragment access meta-information, for randomly accessing and replaying the fragments.

BRIEF DESCRIPTION OF THE DRAWINGS

The above and other aspects and advantages will become more apparent by describing in detail exemplary embodiments with reference to the attached drawings in which.

DETAILED DESCRIPTION

Exemplary embodiments will now be described more fully with reference to the accompanying drawings.

Figure 1:
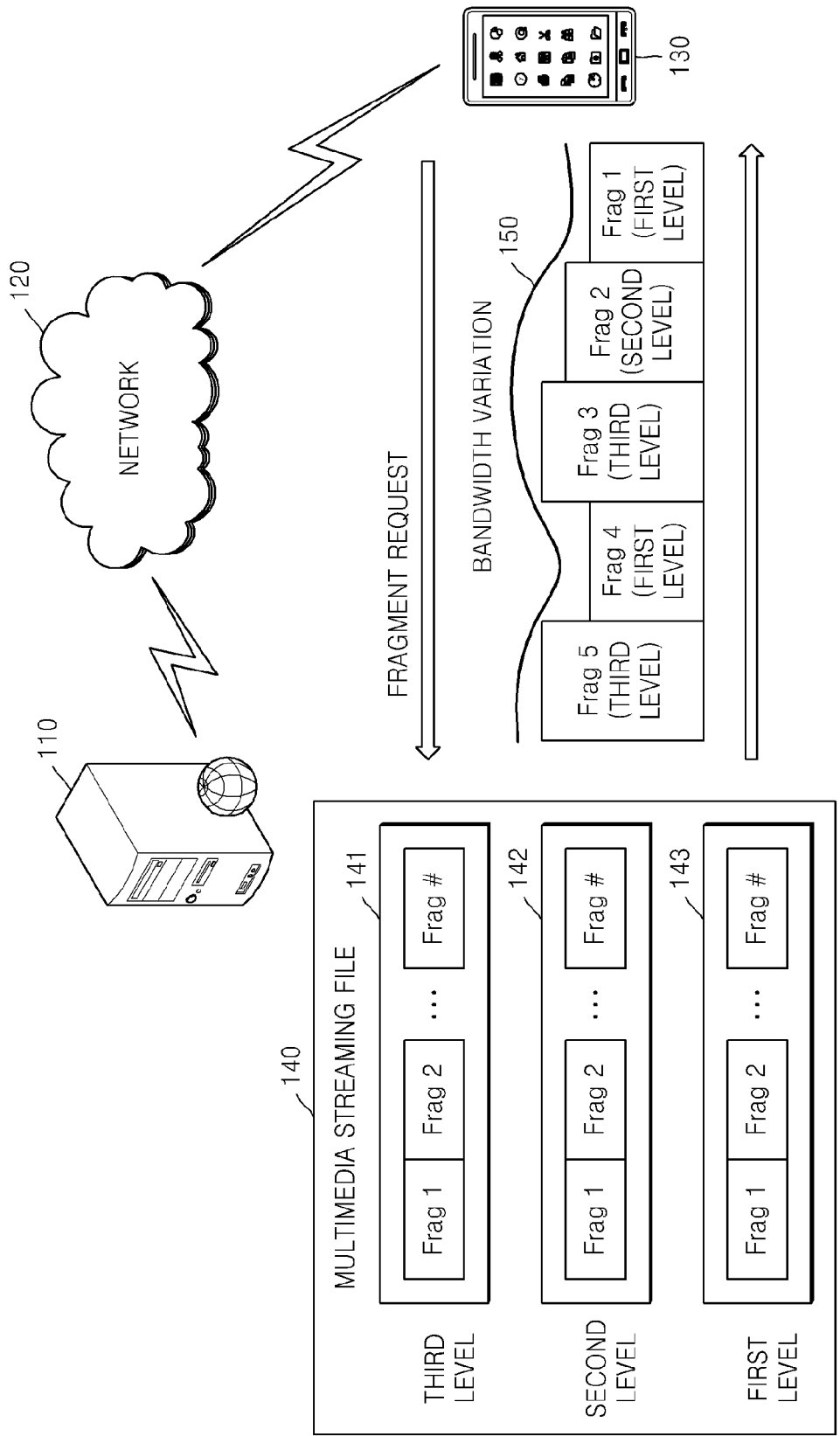
FIG. 1 is a reference diagram for describing an adaptive multimedia streaming service according to an exemplary embodiment.

FIG. 1 is a reference diagram for describing an adaptive multimedia streaming service according to an exemplary embodiment.

Referring to FIG. 1, in the adaptive multimedia streaming service, a server 110 prepares a multimedia streaming file 140 in a plurality of levels in advance by encoding multimedia data at different bit rates and transmits, to a client 130, fragments forming multimedia data in a level selected from among a plurality of levels of multimedia data 141, 142, and 143 forming the multimedia streaming file 140 according to an environment of a network 120 or a request of the client 130. Each of the plurality of levels of the multimedia data 141, 142, and 143 forming the multimedia streaming file 140 may be defined as a track identified by a track identifier Track_ID. The plurality of levels of the multimedia data 141, 142, and 143 forming the multimedia streaming file 140 are encoded according to different methods to have different bit rates. The plurality of levels of the multimedia data 141, 142, and 143 may be identified by resolutions or codecs instead of bit rates.

Each of the plurality of levels of the multimedia data 141, 142, and 143 includes fragments corresponding to multimedia data having a data amount corresponding to seconds. Since fragments in different levels are obtained by encoding the same multimedia data according to respectively different methods, the fragments in different levels have different sizes. For example, fragments forming a first level of the multimedia data 143 may have a bit rate of 1 Mbps, fragments forming a second level of the multimedia data 142 may have a bit rate of 5 Mbps, and fragments forming a third level of the multimedia data 141 may have a bit rate of 10 Mbps. As described above, fragments forming multimedia data in a level selected from among the plurality of levels of the multimedia data 141, 142, and 143 forming the multimedia streaming file 140 are transmitted to the client 130 according to an environment of the network 120 or a request of the client 130. If a bandwidth of the network 120 or a data bandwidth available to the client 130 varies, as referred to by reference numeral 150, the server 110 transmits to the client 130 fragments forming a level of multimedia data having the maximum bit rate suitable for the bandwidth variation from among the plurality of available levels of the multimedia data 141, 142, and 143. That is, fragments are adaptively transmitted according to bandwidths by streaming fragments having the maximum bit rate available in the current bandwidth and streaming fragments having a relatively less bit rate when a current bandwidth has deteriorated. In other words, the level, and the bit rate, of which the fragments are transmitted may change during transmission according to changes in available bandwidth.

In a related art adaptive multimedia streaming service, since the server 110 transmits data in units of fragments according to a request of the client 130 and the client 130 receives and plays fragments corresponding to a portion of the entire multimedia streaming file, it is difficult for the client 130 to replay multimedia data according to the multimedia streaming service.

Thus, exemplary embodiments described herein include use of a storage file format for storing multimedia streaming data by adding, to fragments of data, random access information for replay and meta-information for play, a client apparatus using the storage file format, and a method of storing a multimedia stream in the client apparatus.

Figure 2:
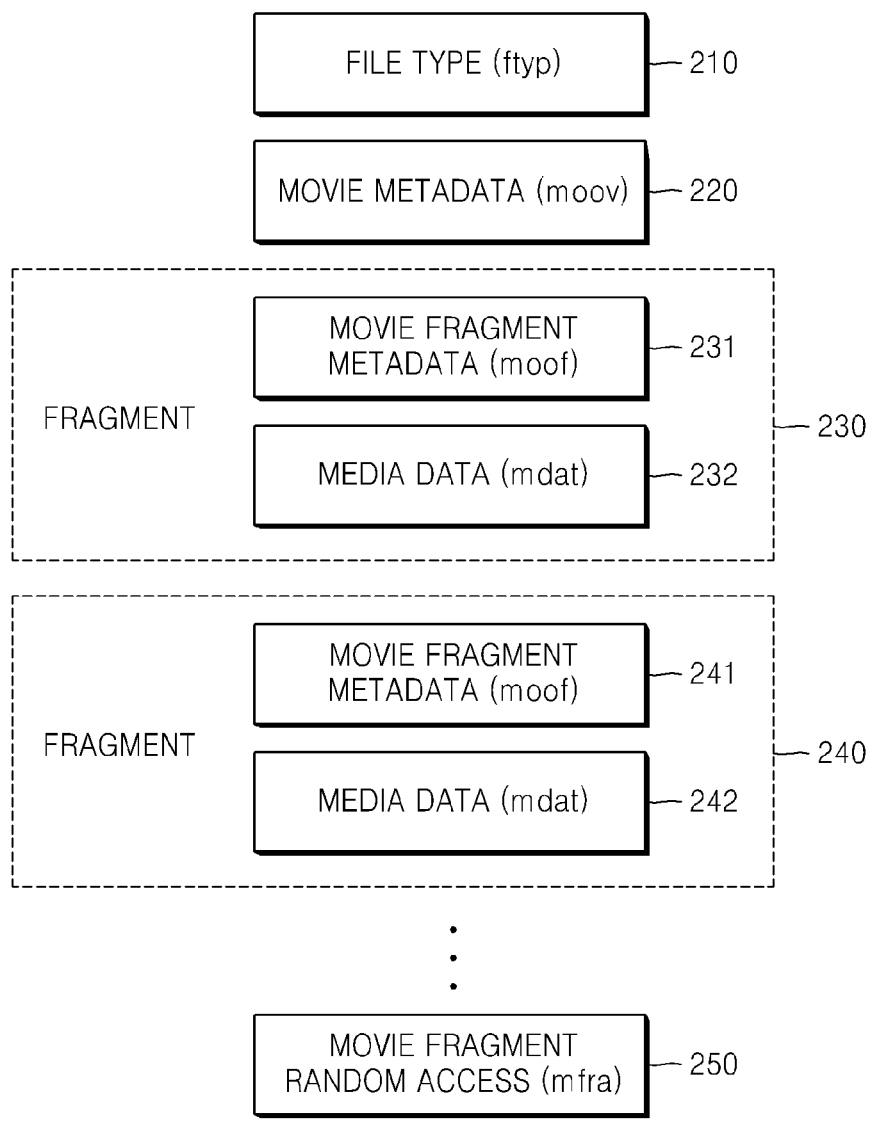
FIG. 2 is a structural diagram of a storage file format of multimedia streaming data according to an exemplary embodiment.

FIG. 2 is a structural diagram of a storage file format of multimedia streaming data according to an exemplary embodiment.

Referring to FIG. 2, the storage file format of multimedia streaming data includes a file type (ftyp) box 210 for storing a file type, a movie metadata (moov) box 220 for storing meta-information for playing a multimedia streaming file to be stored, a plurality of fragments 230 and 240, and a movie fragment random access (mfra) box 250, which has fragment access meta-information, for randomly accessing and replaying stored fragments. Each of the plurality of fragments 230 and 240 includes a fragment header information (moof: movie fragment metadata) box 231 or 241 for storing meta-information of a corresponding fragment and a media data (mdat) box 232 or 242. Although FIG. 2 shows a case where the moov box 220 is immediately after the ftyp box 210, exemplary embodiments are not limited thereto, and the moov box 220 may be between the last fragment and the mfra box 250. In this case, the moov box 220 may further include information for describing a size thereof.

Although the storage file format is described for a case in which the storage file format conforms to an MP4 file format standard, it will be understood by those of ordinary skill in the art through this detailed description that the exemplary embodiments are not limited to the MP4 file format standard and another transfer file format standard may be applicable.

The ftyp box 210 is a box for storing a type of a multimedia streaming file to be stored. As described above, the ftyp box 210 may have values 'm', '4', 'd', and 's' according to the MP4 file format standard.

Figure 3:
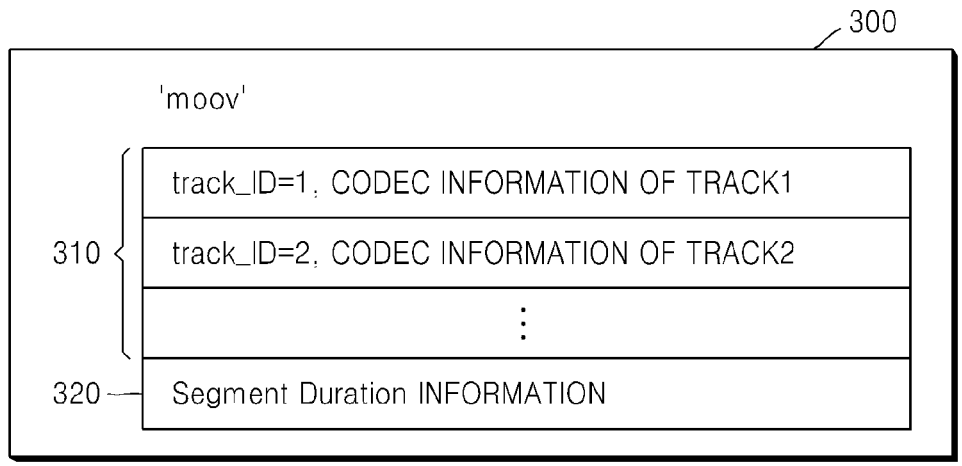
FIG. 3 is a reference diagram for showing a detailed configuration of a movie metadata (moov) box of FIG. 2, according to an exemplary embodiment.

FIG. 3 is a reference diagram for showing a detailed configuration of the moov box 220 of FIG. 2, according to an exemplary embodiment. Referring to FIG. 3, a moov box 300 includes track information 310 including track identifier (track_ID) information for identifying each track of a plurality of levels of multimedia data prepared on a server side and codec information of each track and segment duration information 320 of fragments. By defining unique track_IDs of the track information 310 to a plurality of levels of multimedia data, it may be determined which level of multimedia data the fragments to be stored belong to. To do this, as described below, a track_ID may also be included in fragment header information of each fragment to identify a level of multimedia data to which the fragment belongs. The segment duration information 320 of fragments is used to perform time synchronization in replay or play.

In addition, although not shown in FIG. 3, the moov box 300 may further include segment index information indicating an order of a received fragment based on a multimedia data file provided from the server side. The segment index information may be used to search for a desired fragment.

In the case of a Real Time Streaming Protocol (RTSP)-based adaptive streaming, the meta-information may be delivered in a Session Description Protocol (SDP) format, and in the case of HyperText Transfer Protocol (HTTP)-based adaptive streaming, the meta-information may be delivered to a client in format of a separate metafile, such as a manifest file.

Figure 4:
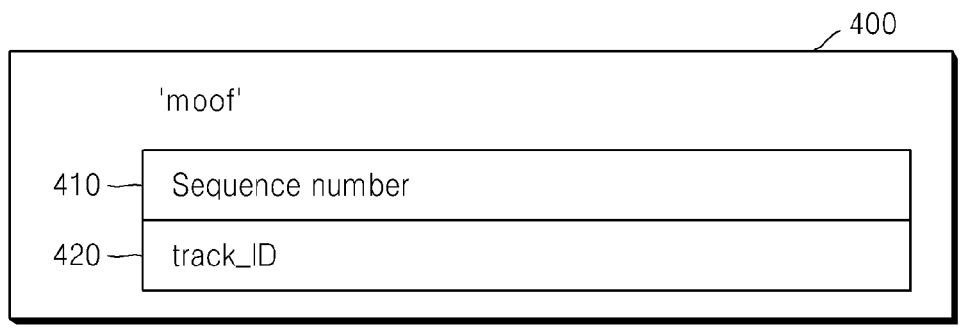
FIG. 4 is a reference diagram for showing a detailed configuration of a fragment header information (moof: movie fragment metadata) box for storing meta-information of each fragment shown in FIG. 2, according to an exemplary embodiment.

FIG. 4 is a reference diagram for showing a detailed configuration of the moof box 231 or 241 for storing meta-information of each fragment shown in FIG. 2, according to an exemplary embodiment.

Referring to FIG. 4, a moof box 400 includes a sequence number 410 allocated a value increasing in an order of fragments to be received and a track_ID 420 used to check a level of multimedia data to which a received fragment belongs. An identifier of each available track may be identified by a server through the above-described track_ID of the track information 310 of FIG. 3, and each level of multimedia data including a fragment may be checked through the track_ID 420 added to each received fragment. The sequence number 410 is allocated to each fragment in a received order and allows a desired fragment to be found among a random access stored fragments. The sequence number 410 is distinct from a segment index indicating an order of a current fragment among all fragments on a server side. Since a fragment transmitted from a server is transmitted at an arbitrary time according to a request of a client, an order received on a client side may be different from a configuration order of multimedia streaming data actually prepared by the server side. For example, each of the three levels of the encoded multimedia data 141, 142, and 143 shown in FIG. 1 includes a fragment having the same segment index. That is, Frag n (n is an integer equal to or greater than 1) of each of the first, second, and third levels in FIG. 1 denotes an nth fragment among all the multimedia data, wherein Frag n of each of the first, second, and third levels has the same segment index. Such segment indexes are sequentially allocated to fragments obtained by dividing the whole multimedia streaming data on the server side. However, in an actual streaming service, an arbitrary fragment is requested and streamed instead of being streamed in a segment index order. Thus, an order of fragments received by the client side may be different from an order of segment indexes of the whole multimedia streaming data prepared by the server side. Accordingly, the sequence number 410 is allocated as a received order to identify an order of a fragment received by the client side, and for a random access to each fragment, a desired fragment may be searched for from among stored fragments by using a segment index and a sequence number thereof.

The moof box 400 is combined with actual mdat, and a fragment reconstructed through this combination forms a single unit for storing a received fragment.

Figure 5:
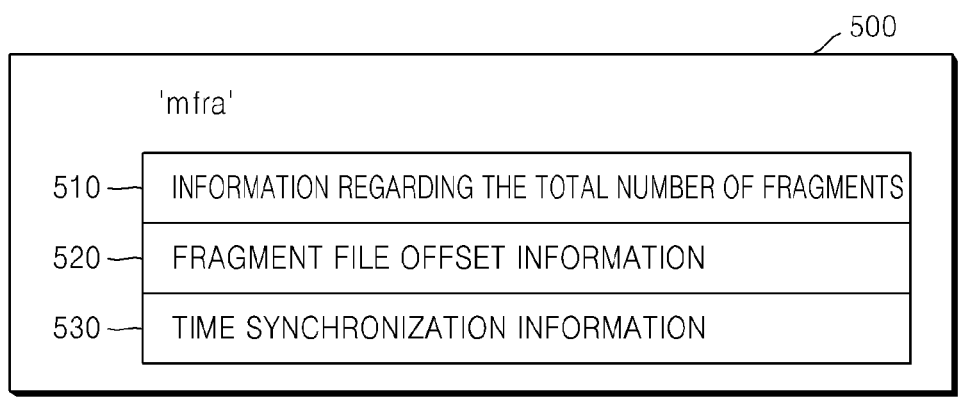
FIG. 5 is a reference diagram for showing a detailed configuration of a movie fragment random access (mfra) box, which is fragment access meta-information, of FIG. 2, according to an exemplary embodiment.

FIG. 5 is a reference diagram for showing a detailed configuration of the mfra box 250, which is fragment access meta-information, of FIG. 2, according to an exemplary embodiment.

Referring to FIG. 5, an mfra box 500 includes information 510 regarding the total number of fragments, fragment file offset information 520, and time synchronization information 530.

The fragment file offset information 520 indicates a storage location of each fragment from the start of a storage file in a storage file format as shown in FIG. 2. A location of the first fragment may be determined using the fragment file offset information 520. The time synchronization information 530 is used for synchronization when mdat included in a fragment is played.

The mfra box 500 may further include segment index information (not shown) to identify a received fragment. As described above, the segment index information indicates an order of each fragment of a multimedia streaming file, and a storage location of a desired fragment may be determined using the segment index information and the fragment file offset information 520. The segment index information may be included in the moov box 220 of FIG. 2 instead of being included in the mfra box 500.

The mfra box 500 may be implemented in the form of a track fragment random access (tfra) box and a movie fragment random access offset (mfro) box for a random access to an MP4 file format.

A client apparatus for storing a multimedia stream served by a server will now be described using the storage file format described with reference to FIGS. 2 to 5.

Figure 6:
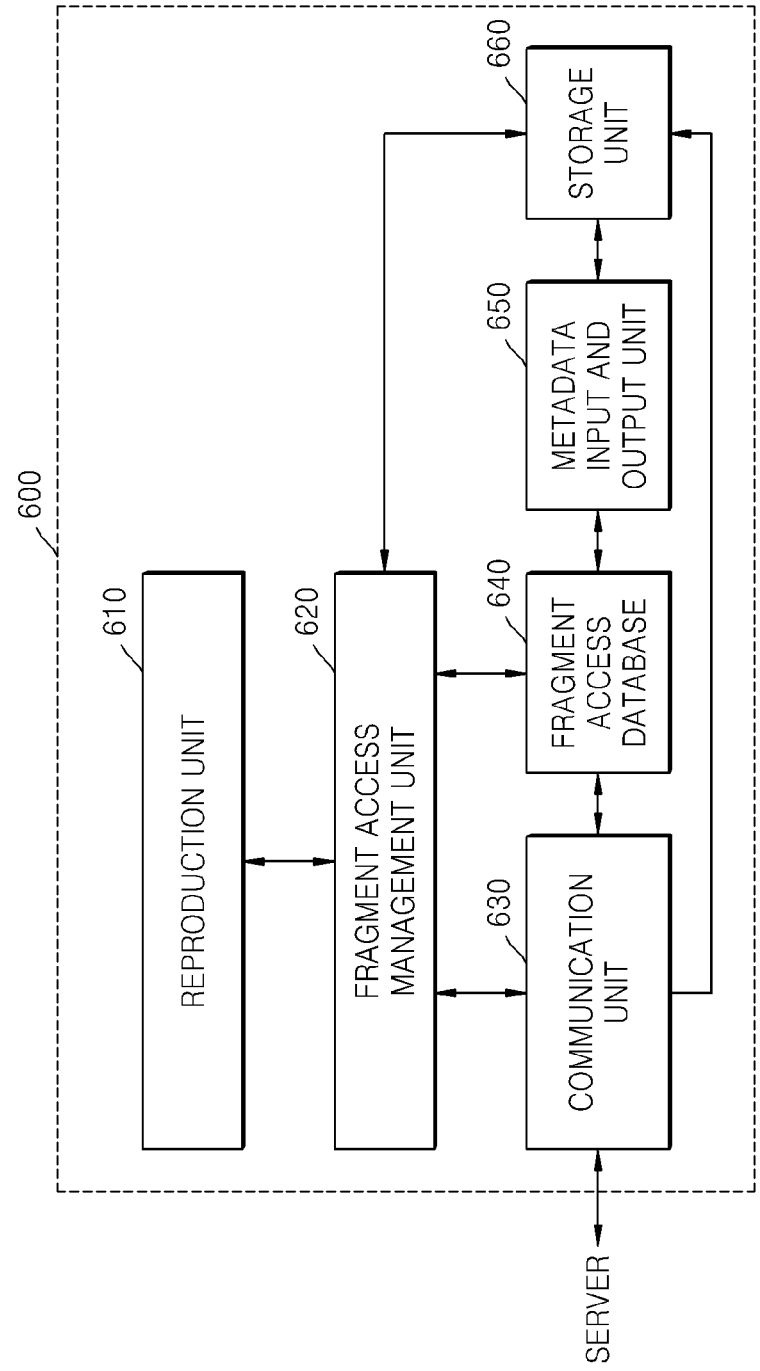
FIG. 6 is a block diagram of a client apparatus according to an exemplary embodiment.

FIG. 6 is a block diagram of a client apparatus 600 according to an exemplary embodiment.

Referring to FIG. 6, the client apparatus 600 includes a reproduction unit 610, a fragment access management unit 620, a communication unit 630, a fragment access database 640, a metadata input and output unit 650, and a storage unit 660.

The reproduction unit 610 is a module for playing a multimedia streaming file and requests the fragment access management unit 620 to provide a fragment forming data of a predetermined frame when the data of a predetermined frame is requested through a user interface (not shown). At this time, the reproduction unit 610 may also transmit level information to the fragment access management unit 620, the level information indicating which level of the multimedia streaming file is needed from among a plurality of levels of tracks encoded at different bit rates included in the multimedia streaming file.

The fragment access management unit 620 determines, through the fragment access database 640, whether the fragment corresponding to the data of the frame requested by the reproduction unit 610 is stored. If the requested fragment is not stored in the storage unit 660, the fragment access management unit 620 controls the communication unit 630 to receive the requested fragment from a server. Otherwise, if the requested fragment is stored in the storage unit 660, the fragment access management unit 620 reads the requested fragment from the storage unit 660. The fragment access management unit 620 also functions as a parser.

The storage unit 660 stores a storage file in a form in which fragments received from the server are combined with a moov box corresponding to meta-information and an mfra box corresponding to fragment access meta-information, according to a storage file format as shown in FIG. 2.

The fragment access database 640 stores information fragments received through the communication unit 630 and stored in the storage unit 660. In detail, the fragment access database 640 stores the meta-information included in the moov box and the fragment access meta-information included in the mfra box as described in FIG. 2. That is, the fragment access database 640 stores a track_ID, a segment index, a sequence number, a start time, moof box offset information, information regarding the total number of fragments, fragment offset information, and a media start point in a fragment or information for calculating the media start point of each of the fragments stored in the storage unit 660.

The communication unit 630 transmits a request to the server to transmit a fragment according to a control of the fragment access management unit 620. In detail, the communication unit 630 receives information regarding a requested segment index and a desired level from the fragment access management unit 620 and requests a corresponding fragment from the server. At this time, the communication unit 630 may determine a level of the fragment suitable for reception by using information, such as a network state, a residual buffer amount in the client apparatus 600, and an available resource such as a memory, and may request the determined level of fragment from the server. For example, if the fragment access management unit 620 requests a fragment having a segment index of 3 from among a second level of multimedia streaming data having a bit rate of 5 Mbps, the communication unit 630 requests the server to transmit the fragment having the segment index value and the level value. If a network environment or a client residual buffer amount is too bad or too insufficient to receive and process the fragment at the bit rate of 5 Mbps, the communication unit 630 may request a fragment having a bit rate of 1 Mbps in a first level lower than the requested level from the server.

The metadata input and output unit 650 generates a storage file according to a storage file format, as shown in FIG. 2, by generating a moov box corresponding to meta-information for playing a multimedia streaming file and an mfra box, which is fragment access meta-information, for replaying stored fragments and combining received fragments with the generated moov box and mfra box and stores the generated storage file in the storage unit 660. In addition, the metadata input and output unit 650 extracts meta-information stored in the storage unit 660 and transmits the extracted meta-information to the fragment access database 640 so as to update the fragment access database 640 when a file stored in the storage unit 660 is loaded.

Hereinafter, an operation of the client apparatus 600 shown in FIG. 6 is described in detail.

In an initial operation, the metadata input and output unit 650 initializes the fragment access database 640 by loading a file stored in the storage unit 660. In detail, the metadata input and output unit 650 loads a moov box and an mfra box of a storage file stored in the storage unit 660 and transmits the moov box and the mfra box to the fragment access database 640, and the fragment access database 640 acquires the total number of fragments currently stored in the storage unit 660 by parsing the mfra box and acquires information, such as a track_ID in each level and a codec required to play a track in each level, by parsing the moov box. In addition, the fragment access database 640 sets a sequence number at a present time by using information regarding the number of fragments and a track_ID per level obtained from the moov box and the mfra box. For example, if a sequence number received up until the present is 10000, sequence numbers at the present time are set so that sequence numbers from 10001 are allocated to fragments received through the communication unit 630 thereafter. That is, non-duplicated sequence numbers may be allocated to fragments received thereafter through the sequence number initial setting.

When the reproduction unit 610 requests or searches for frame data, the fragment access management unit 620 determines, through the fragment access database 640, whether the requested fragment corresponding to the requested frame data is stored in the storage unit 660.

If the requested fragment is not stored in the storage unit 660, the fragment access management unit 620 transmits information regarding a segment index and a desired level of the requested fragment to the communication unit 630. The communication unit 630 transmits a request to the server to transmit a fragment in a suitable level based on a network environment and a residual buffer amount and an available resource of the client apparatus 600. The metadata input and output unit 650 reconstructs a fragment completely received through the communication unit 630 by adding a sequence number and a track_ID to the received fragment and stores the reconstructed fragment in the storage unit 660. In addition, the metadata input and output unit 650 updates information regarding the moov box and the mfra box stored in the storage unit 660 based on information regarding the newly received fragment. If the moov box is located immediately before the mfra box instead of being located immediately after a ftyp box, as described with reference to FIG. 2, since the existing moov box is overwritten by the newly received fragment, the metadata input and output unit 650 may generate a new moov box and store the generated moov box immediately after the newly received fragment.

In addition, the metadata input and output unit 650 transmits information regarding the newly received fragment to the fragment access database 640, and the fragment access database 640 updates itself based on the transmitted information.

Otherwise, if the requested fragment is received through the communication unit 630, the fragment access management unit 620 transmits the received fragment to the reproduction unit 610.

If the requested fragment is stored in the storage unit 660, the fragment access management unit 620 reads the requested fragment from the storage unit 660 and transmits the requested fragment to the reproduction unit 610.

As described above, the client apparatus 600 may replay a multimedia stream by adding a moov box corresponding to meta-information and an mfra box for a random access to the multimedia stream transmitted in units of fragments and by storing the multimedia stream together with the moov box and the mfra box.

A client apparatus according to another exemplary embodiment will now be described.

The client apparatus according to another exemplary embodiment has the same configuration as the client apparatus 600 shown in FIG. 6 except for its operation.

Figure 7:
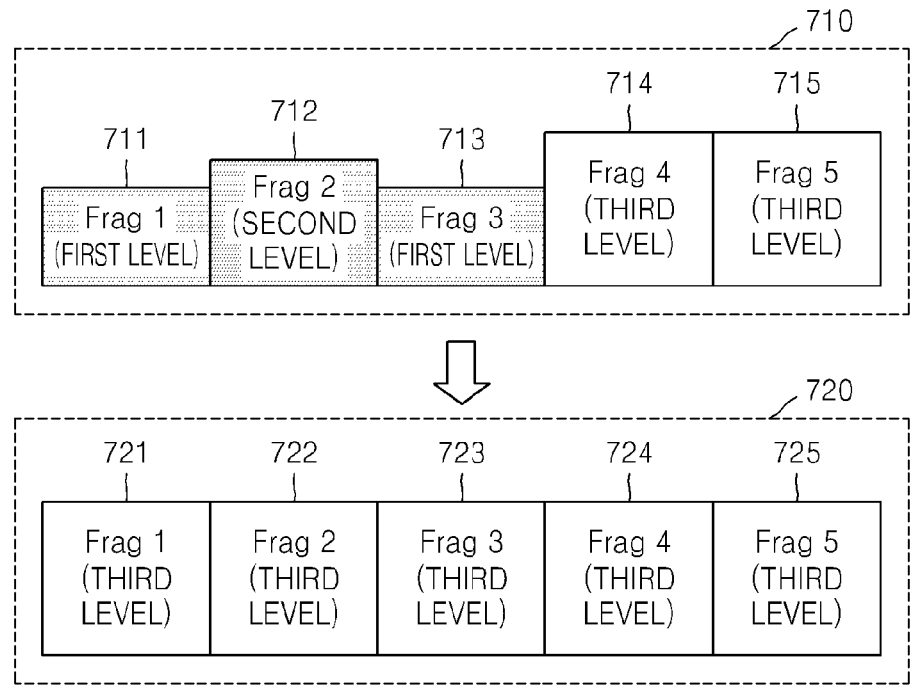
FIG. 7 is a reference diagram for describing a client apparatus according to another exemplary embodiment.

FIG. 7 is a reference diagram for describing the client apparatus according to another exemplary embodiment.

Referring to FIG. 7, the client apparatus may replay relatively-high-quality multimedia data by storing fragments of higher quality than others through comparison of a level of each fragment 710 stored in the storage unit 660 and a level of each of the corresponding receivable fragments. In FIG. 7, a first level has a bit rate of 1 Mbps, a second level has a bit rate of 5 Mbps, and a third level has a bit rate of 10 Mbps, wherein a level value of the first level is 1, a level value of the second level is 2, and a level value of the third level is 3. If the maximum available level value is 3, the client apparatus stores each fragment as a fragment having a possibly greater level value. That is, as shown in FIG. 7, for existing fragments Frag1 711, Frag2 712, and Frag3 713 in the first or second level, which are stored in the storage unit 660, fragments Frag1 721, Frag2 722, and Frag3 723 in the third level, each having the highest quality and the same segment index, are received again and stored.

In detail, when the reproduction unit 610 requests for frame data, the reproduction unit 610 transmits a desired level value besides segment index information of a corresponding fragment to the fragment access management unit 620.

The fragment access management unit 620 determines whether a fragment having the requested level value and the requested segment index is stored in the storage unit 660. In detail, the fragment access management unit 620 acquires information regarding a fragment in the highest level from among fragments having the requested segment index, which are currently stored in the storage unit 660, and determines whether the fragment in the highest level, which has the requested segment index and is currently stored in the storage unit 660, satisfies quality according to the requested level value. If the fragment in the highest level, which has the requested segment index and is currently stored in the storage unit 660, is a fragment of the desired quality, the fragment access management unit 620 reads the fragment in the highest level from the storage unit 660 and transmits the read fragment to the reproduction unit 610.

If no fragment having the requested segment index is stored in the storage unit 660, or if no fragments stored in the storage unit 660 satisfy the desired quality, the fragment access management unit 620 transmits information regarding a segment index and a desired level of a required fragment to the communication unit 630. The fragment access management unit 620 may control the communication unit 630 to request and receive a fragment in the currently available highest level based on a network environment and a residual buffer amount and an available resource of the client apparatus. In addition, if the fragment in the currently available highest level is newly received, the fragment access management unit 620 may compare a level value of the newly received fragment with levels of fragments stored in the storage unit 660 and transmit a fragment in a higher level, i.e., higher quality, than others to the reproduction unit 610. In addition, the fragment access management unit 620 may compare a level of a fragment providable by the server with the currently available highest level, and if the currently available highest level is lower than the level of the fragment providable by the server due to the network environment or the lack of the resource of the client apparatus, the fragment access management unit 620 may control the communication unit 630 to receive the corresponding fragment when the network environment or the lack of the resource of the client apparatus is resolved thereafter.

The metadata input and output unit 650 reconstructs a fragment completely received through the communication unit 630 by adding a sequence number and a track_ID to the received fragment and stores the reconstructed fragment in the storage unit 660. In addition, the metadata input and output unit 650 updates information regarding the moov box and the mfra box stored in the storage unit 660 based on information regarding the newly received fragment.

In addition, the metadata input and output unit 650 transmits information regarding the newly received fragment to the fragment access database 640, and the fragment access database 640 updates itself based on the transmitted information.

If a fragment having the desired level value is received through the communication unit 630, the fragment access management unit 620 transmits the received fragment to the reproduction unit 610.

This operation of receiving a high-quality fragment may be performed independently through a background module. That is, the client apparatus 600 may further include a separate background download module (not shown), wherein if a fragment having a corresponding segment index from among fragments having segment indexes after a segment index of a currently played fragment is not stored in the storage unit 660 or does not have a desired quality even though it is stored in the storage unit 660, the background download module receives the fragment having a corresponding segment index from the server and stores the received fragment in the storage unit 660 through a background operation.

Figure 8:
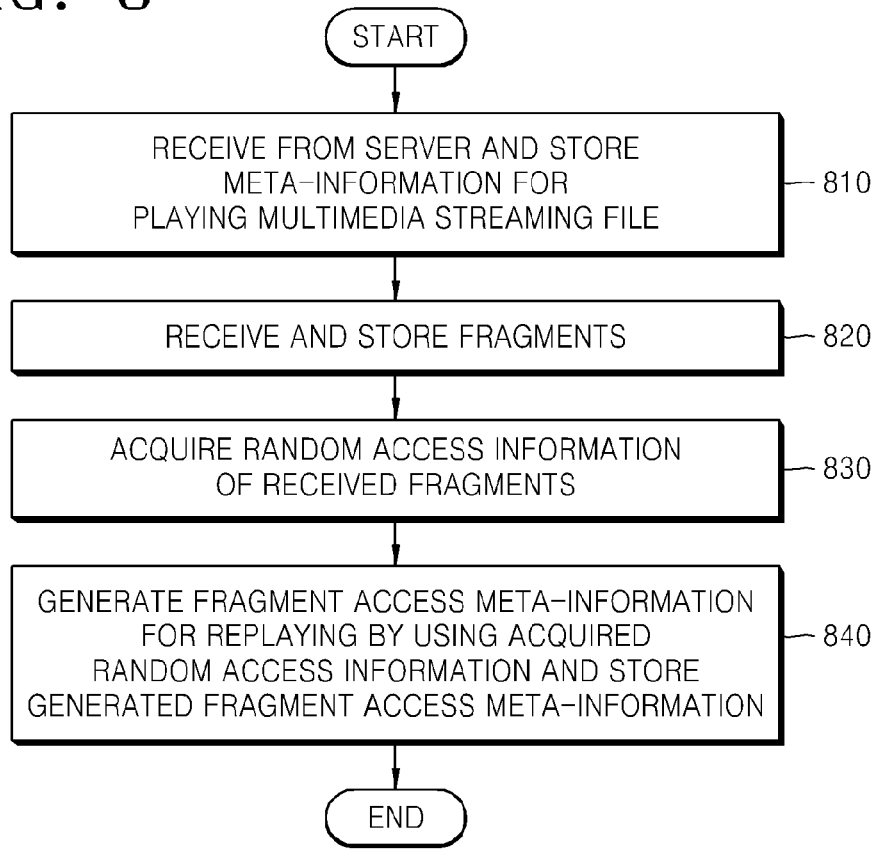
FIG. 8 is a flowchart of a method of storing a multimedia streaming file, according to an exemplary embodiment.

FIG. 8 is a flowchart of a method of storing a multimedia streaming file, according to an exemplary embodiment.

Referring to FIG. 8, in operation 810, meta-information for playing a multimedia streaming file including a plurality of levels of tracks obtained by encoding multimedia data at different bit rates is received from a server providing the multimedia streaming file and is stored. As described above, the meta-information includes track information for the tracks in the plurality of levels, codec information, and fragment length information.

In operation 820, fragments forming the multimedia streaming file are received and stored. In detail, fragment header information including track information of the received fragments and sequence numbers allocated in a received order of the fragments is generated, and fragments reconstructed by combining a portion of multimedia data included in the received fragments with the fragment header information are stored.

In operation 830, random access information for a random access to the received fragments is acquired. The random access information may include segment index information for identifying the received fragments, information regarding the total number of received fragments, and multimedia time synchronization information.

In operation 840, fragment access meta-information for replaying the stored fragments by using the acquired random access information is generated and stored. As described above, the fragment access meta-information may be stored using an mfra box according to the MP4 file format.

Figure 9:
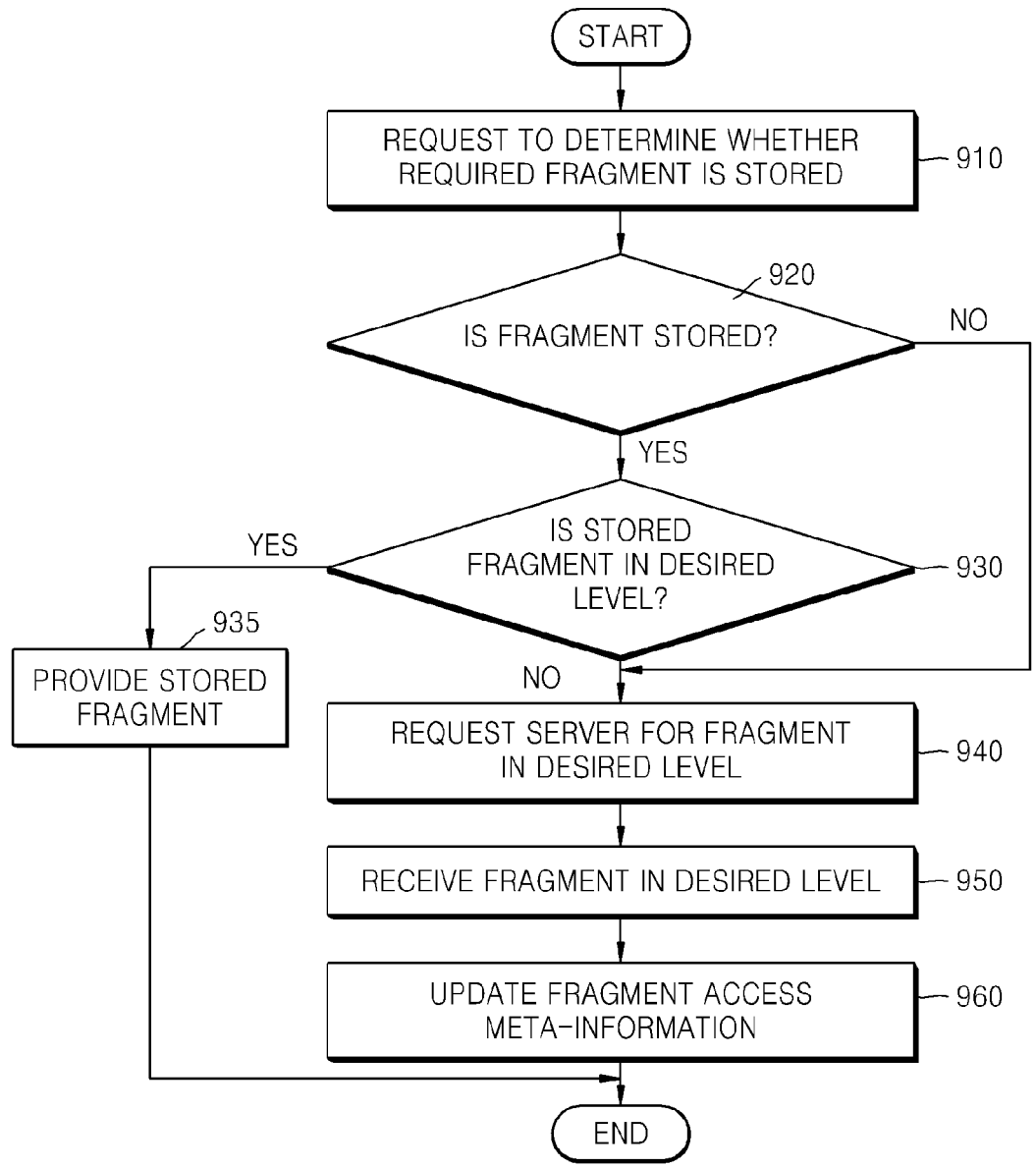
FIG. 9 is a flowchart of a method of storing a multimedia streaming file, according to another exemplary embodiment.

FIG. 9 is a flowchart of a method of storing a multimedia streaming file, according to another exemplary embodiment.

Referring to FIG. 9, in operation 910, it is requested to determine using a requested segment index and a desired level value of a fragment required for a client apparatus whether the fragment is stored.

In operation 920, it is determined whether any fragment having the requested segment index is stored, and if a determination result of operation 920 is that a fragment having the requested segment index is stored, it is determined in operation 930 whether the stored fragment satisfies a desired quality. If the fragment having the requested segment index satisfies the desired quality, the stored fragment is provided in operation 935.

Otherwise, if any fragment having the requested segment index is not stored, or if the stored fragment does not satisfy the desired quality, a fragment with the requested segment index and the desired level value is requested from a server in operation 940.

In operation 950, the fragment with the requested segment index and the desired level value is received, and in operation 960, fragment access meta-information and meta-information for playing are updated using the newly received fragment. That is, in operation 960, a moov box and an mfra box are updated using the newly received fragment.

According to exemplary embodiments described herein, multimedia data provided in an adaptive streaming service can be stored online and played offline.

In addition, according to exemplary embodiments, when stored multimedia streaming data is played, higher quality of multimedia data than before can be played Exemplary embodiments can also be embodied as computer-readable codes on a computer-readable recording medium. The computer-readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and so forth. The computer-readable recording medium can also be distributed over network coupled computer systems so that the computer-readable code is stored and executed in a distributed fashion.

While exemplary embodiments have been particularly shown and described, it will be understood by those skilled in the art that various changes in form and details may be made therein without departing from the spirit and scope of the inventive concept as defined by the appended claims. Therefore, the scope of the inventive concept is defined not by the detailed description of the invention but by the appended claims, and all differences within the scope will be construed as being included in the present invention.

What is claimed is:

1. A method of storing a multimedia streaming file, the method comprising:
   comparing a level of each of stored fragments with a level of a fragment comprising the multimedia stream file which can be provided from a server which provides the multimedia streaming file, wherein the multimedia streaming file comprises a plurality of levels of tracks, wherein, in each of the plurality of levels of tracks, multimedia data is encoded at a different bit rate;
   when a fragment in a higher level than the level of each of the stored fragments can be provided, transmitting a request for the fragment in a higher level;
   receiving and storing the fragment in the higher level;
   acquiring random access information for randomly accessing the fragment in the higher level; and
   generating and storing fragment access meta-information for replaying the fragments in the higher level based on the acquired random access information.

2. The method of claim 1, wherein each of the fragments is a portion of multimedia data of a track in a level, and further comprising selecting a level of the track of at least one of the fragments, from among the plurality of levels of tracks, according to a network environment or a request of a client.

3. The method of claim 1, wherein the meta-information comprises track information of each of the plurality of levels of tracks, codec information, and fragment length information.

4. The method of claim 1, wherein the receiving and storing the fragment in the higher level comprises:
   generating fragment header information comprising track information of the received fragments and sequence numbers allocated in a received order of the fragments; and
   storing fragments reconstructed by combining a portion of multimedia data included in the received fragments and the fragment header information.

5. The method of claim 1, wherein the acquiring the random access information comprises acquiring segment index information for identifying each of the received fragments forming the multimedia streaming file, information regarding the total number of received fragments, and multimedia time synchronization information.

6. The method of claim 1, wherein the storing the fragment access meta-information comprises storing using a movie fragment random access box according to an MP4 file format.

7. The method of claim 1, further comprising:
   determining whether the level of each of the stored fragments has a level value equal to or greater than a predetermined bit rate;
   if the level of each of the stored fragments does not have a level value equal to or greater than the predetermined bit rate, transmitting a request for a fragment having a level value equal to or greater than the predetermined bit rate;
   receiving and storing the fragment having the level value equal to or greater than the predetermined bit rate; and
   acquiring random access information of the fragment having the level value equal to or greater than the predetermined bit rate and updating the fragment access meta-information by using the acquired random access information of the fragment having the level value equal to or greater than the predetermined bit rate.

8. A client apparatus for receiving a multimedia streaming file, the client apparatus comprising:
   a fragment access management unit which compares a level of stored fragments with a level of a fragment comprising the multimedia stream file which can be provided from a server which provides the multimedia streaming file, wherein the multimedia streaming file comprises a plurality of levels of tracks, wherein, in each of the plurality of levels racks, multimedia data is encoded at a different bit rate;
   a communication unit which transmits a request for a fragment in a higher level when the fragment in a higher level than the level of each of the stored fragments can be provided;
   a storage unit which stores the fragment received by the communication unit in the higher level;
   a fragment access database which acquires random access information for randomly accessing the fragment in the higher level; and
   a metadata input and output unit which generates fragment access meta-information based on the acquired random access information and stores fragment access meta-information in the storage unit.

9. The client apparatus of claim 8, wherein each of the fragments is a portion of multimedia data of a track in a level selected, according to a network environment or a request of a client, from among the plurality of levels of tracks.

10. The client apparatus of claim 8, wherein the meta-information comprises track information of each of the plurality of levels of tracks, codec information, and fragment length information.

11. The client apparatus of claim 8, wherein
   the metadata input and output unit generates fragment header information comprising track information of the received fragments and sequence numbers allocated in a received order of the fragments, and
   the storage unit stores fragments reconstructed by combining a portion of multimedia data included in the received fragments and the fragment header information.

12. The client apparatus of claim 8, wherein the random access information comprises segment index information for identifying each of the received fragments forming the multimedia streaming file, information regarding the total number of received fragments, and multimedia time synchronization information.

13. The client apparatus of claim 8, wherein the metadata input and output unit stores the fragment access meta-information using a movie fragment random access box according to an MP4 file format.

14. The client apparatus of claim 8, wherein the fragment access management unit compares a level of each of the stored fragments with a level of a fragment available and, if a fragment in a higher level than the level of each of the stored fragments is available, controls the communication unit to transmit a request for the fragment in the higher level.

15. The client apparatus of claim 14, wherein, if the fragment in the higher level is received, the fragment access management unit updates the fragment access meta-information by using random access information of the fragment in the higher level.

16. The client apparatus of claim 8, wherein the fragment access management unit determines whether the level of each of the stored fragments has a level value equal to or greater than a predetermined bit rate, and if the level of each of the stored fragments does not have a level value equal to or greater than the predetermined bit rate, controls the communication unit to transmit a request for a fragment having a level value equal to or greater than the predetermined bit rate.

17. A multimedia streaming file system comprising:
a server which prepares a multimedia streaming file comprising a plurality of levels, wherein each of the plurality of levels comprises the same multimedia data encoded at a bit rate different from each of the other levels, and wherein each of the plurality of levels comprises the multimedia data divided into a plurality of fragments; and
a client apparatus comprising:
a fragment access management unit which compares a level of stored fragments with a level of a fragment comprising the multimedia stream file which can be provided from the server;
a communication unit which transmits a request for a fragment in a higher level when the fragment in a higher level than the level of each of the stored fragments can be provided;
a storage unit which stores the fragment received by the communication unit in the higher level;
a fragment access database which acquires random access information for randomly accessing the fragment in the higher level; and
a metadata input and output unit which generates fragment access meta-information based on the acquired random access information and stores the fragment access meta-information in the storage unit.

* * * * *